United States Patent [19]

de Figueiredo et al.

[11] 4,388,340

[45] Jun. 14, 1983

[54] PROCESS FOR THE PRODUCTION OF A FROZEN CHOPPED EGG PRODUCT

[75] Inventors: Mario P. de Figueiredo, Chesterfield; Balagtas F. Guevara, St. Louis; James L. Long, Creve Coeur; Ronnie G. Morgan; Lawrence R. York, both of Manchester, all of Mo.

[73] Assignee: Ralston Purina Company, St. Louis, Mo.

[21] Appl. No.: 308,710

[22] Filed: Oct. 5, 1981

Related U.S. Application Data

[63] Continuation-in-part of Ser. No. 184,584, Sep. 5, 1980, abandoned.

[51] Int. Cl.³ .............................................. A23L 1/32
[52] U.S. Cl. .................................. 426/614; 426/518; 426/524
[58] Field of Search .................. 426/614, 524, 518

[56] References Cited

U.S. PATENT DOCUMENTS

| | | | |
|---|---|---|---|
| 2,052,221 | 8/1936 | Dubil | 426/524 X |
| 2,349,465 | 5/1944 | Rupin | 426/524 X |
| 3,232,769 | 2/1966 | Miller | 426/614 X |
| 3,510,315 | 5/1970 | Hawley | 426/614 X |
| 3,561,972 | 2/1971 | Dodge et al. | 426/614 X |
| 3,598,612 | 8/1971 | Hg | 426/614 X |
| 3,598,613 | 8/1971 | Hawley | 426/614 X |
| 3,624,230 | 11/1971 | Robinson, Jr. | 426/614 |
| 4,195,098 | 3/1980 | Otto | 426/524 X |

OTHER PUBLICATIONS

De Guoy, L. P., "The Gold Cook Book", Chilton Book Co., Radnor, Pa., pp. 152, 153.

*Primary Examiner*—Robert A. Yoncoskie
*Attorney, Agent, or Firm*—Virgil B. Hill

[57] ABSTRACT

A cooked and frozen chopped egg product is disclosed which is suitable as a condiment for foodstuffs. The chopped egg product is produced by a process comprising; dynamically or continuously preheating egg yolks to a product temperature which does not exceed about 183° F. and dynamically or continuously preheating egg whites to a product temperature which does not exceed about 167° F. Preheating of the yolks and whites is followed by statically heating the egg yolks and whites at a temperature and time effective to coagulate the yolks and whites to a substantially firm texture followed by freezing of the coagulated yolks and whites. The frozen whites and yolks are chopped at a temperature of 20°–30° F. to provide a chopped egg mixture having desirable color and texture, without significant smearing of the yolks on the particles of egg white.

18 Claims, No Drawings

PROCESS FOR THE PRODUCTION OF A FROZEN CHOPPED EGG PRODUCT

This is a continuation-in-part of application Ser. No. 184,584, filed Sep. 5, 1980 now abandoned.

BACKGROUND OF THE INVENTION

The present invention relates to a chopped egg product and a process for producing the same.

Various types of egg products have been produced for consumer use. Raw egg products have been prepared and frozen in order that they may be subsequently thawed and used in the same manner as fresh eggs. More recently, cooked egg products have been produced which are suitable for freezing with subsequent thawing and use. These cooked egg products are very desirable because of the convenience of simply thawing the product to permit use by the consumer. These products and processes for their production are generally described in the following U.S. Patents.

U.S. Pat. No. 3,510,315 describes a cooked egg product in which the yolks are separately cooked in a mold and placed in a larger mold in which the uncooked egg whites are placed and cooked surround the yolk. The mixture is frozen and a starch material is included in the whites to provide good freeze-thaw stability. A frozen product with an egg yolk core surrounded by cooked egg white is obtained which can easily be thawed and used by the consumer.

Improvements on the above process for the production of cooked frozen egg products are described in U.S. Pat. No. 3,598,612 in which treatment of the yolk with an oxidizing agent prevents discoloration of the interface area between the yolk and white. U.S. Pat. No. 3,598,613 describes a process in which the yolks are preheated in a jet cooker to a solid or semi-solid state, ground and then heated to form a solid yolk product. U.S. Pat. Nos. 3,798,336 and 3,711,304 describe processes and apparatus for centering of the yolk body in the egg whites before or during cooking to form a core of egg yolk concentrically surrounded by the cooked whites. These products can be conveniently thawed and sliced and easily used by the consumer without cooking and peeling of shell eggs.

The above types of cooked, frozen egg products have been extensively used by restaurants and institutions engaged in mass feeding in this country, has been the salad bar in which the customer can prepare his own salad with ingredients of his own choosing. A popular ingredient at these salad bars is chopped or diced eggs which can be sprinkled on the salad by the customer. Obviously, the cooking and chopping of eggs requires an extensive amount of preparation, in addition to the fact that chopping usually smears the yolk over the egg white particles resulting in a pasty mess the consumer does not readily associate with chopped eggs. In addition, when whole eggs are cooked, they also suffer from problems with green discoloration of the yolk surface which is visible in a chopped egg product since the particles are exposed by virtue of being chopped up or diced.

While the cooked, frozen egg products described above avoid many of the discoloration problems associated with whole eggs, nevertheless, these products also present a poor appearance if they were simply thawed and chopped or diced since the yolk readily smears onto the whites. A need, therefore, exists for a chopped frozen egg product without significant smearing of the yolks on the whites, which has a smooth texture, and may be readily thawed and used by the consumer as an ingredient in or as a condiment for foods.

U.S. application serial No. 308,709, filed Oct. 5, 1981, which is a continuation-in-part of U.S. application Ser. No. 184,585, filed Sept. 9, 1980, discloses a chopped egg product of highly desirable characteristics in which smearing of the yolk during chopping is avoided by carrying out the chopping at a critically defined temperature range. The process disclosed therein involves a single stage heating step in which the yolks and whites are separately heated to coagulate them prior to chopping.

It would be highly desirable to employ a process in which the yolks and whites can be coagulated on a continuous basis. In evaluating means for the continuous or dynamic coagulation of the yolks and whites, it was determined that the shear forces normally encountered in the dynamic heating of fluids adversely affect the texture of the yolks and the whites and if the temperature was increased during dynamic heating to effectively coagulate the yolks and whites, the yolks and whites would still maintain a soft state.

Accordingly, it was determined that dynamic or continuous heating could be used only if it was used for preheating of the yolks and whites and carried out below a critically defined product temperature. Dynamic preheating of the yolks and whites is followed by heating or maintaining the product at a given temperature under static conditions to effectively coagulate the yolks and whites to a substantially firm texture and provide the requisite texture needed for subsequent freezing and chopping of the yolks and whites.

It is, therefore, an object of the present invention to provide a cooked frozen chopped egg product which avoids significant smearing of the yolk on the chopped egg white particles.

It is also an object of the present invention to provide a cooked and frozen chopped egg product which employs a dynamic or continuous cooking process for preheating of the yolks and whites for faster cooking time with greater energy savings.

It is also an object to provide a cooked and frozen chopped egg product in which the yolk is a bright yellow with an absence of discoloration.

It is also an object to provide a cooked and frozen chopped egg product which has good freeze-thaw stability without significant deterioration of the yolks and whites during storage.

It is also an object to provide a cooked and frozen chopped egg product which has a smooth but firm texture without significant sticking or clumping of the particles of yolks and whites.

It is a further object to provide a unique process for the production of a cooked and frozen chopped egg product which meets the above objectives which is reliable and convenient to practice on a commercial basis.

SUMMARY OF THE INVENTION

These and other objects are achieved in the present invention which provides a unique process for the production of a cooked and frozen chopped egg product.

The present process comprises dynamically preheating egg yolks to a product temperature which does not exceed about 183° F. and egg whites to a product temperature which does not exceed about 167° F. followed by static heating of egg yolks and whites at and for a period of time sufficient to coagulate or effectively cook the yolks and the whites to a substantially firm texture. The separately cooked yolks and whites are then frozen. A chopped egg mixture is formed by simultaneously or sequentially chopping the frozen yolks and whites at a critical temperature range of between about 20°–30° F. to provide a chopped egg mixture in which minimal smearing of the yolk on the whites occurs during chopping and the mixture has a smooth but firm texture. The chopped mixture can then be refrozen and sold in this fashion for use by restaurants or institutions as a food condiment. The product represents a distinct improvement over cooked, chopped, shell eggs in appearance and texture as well as convenience to the user of the product.

A significant factor in the above process which provides the chopped egg product with such desirable appearance and texture is the temperature range at which the simultaneous or sequential chopping of the cooked yolk and white is carried out. For example, if the temperature of the cooked egg during chopping is above this temperature range, extensive smearing of the yolk and the white occurs resulting in a product with an undesirable appearance. By contrast, at a temperature below this range, the yolk and the white tend to shatter or splinter resulting in powder and an excessive amount of fines which will also detract from the appearance of the mixture. Also, the danger of chopper blade breakage and other processing equipment damage increases when the egg product is chopped at temperatures below this range. It should be understood that if the egg product is chopped below these temperatures, not all egg pieces produced will be fines or powder. However, enough product will be of such a small size as to make the process uneconomic for the production of chopped egg pieces.

Likewise, it is important relative to the above process that dynamic or continuous preheating be carried out below a specified product temperature, since it has been determined if this temperature is exceeded during dynamic preheating subsequent static heating will not coagulate the yolk and white to a firm texture and it will remain soft. The combination of dynamic and static heating can improve the efficiency of the present process by reducing the overall cooking time with greater energy savings.

DESCRIPTION OF THE PREFERRED EMBODIMENTS

In accordance with the present invention, pasteurized liquid egg yolks and whites are obtained and placed into separate containers for heating. It is not critical to the present invention that the yolks or whites include additional ingredients although various flavorings, spices, and/or seasonings can be included if desired. It is extremely desirable however, to include a water binding material in the egg whites since the product will be frozen and the addition of the water binding material prevents syneresis during subsequent freezing and thawing of the product. The water binding materials which may be employed in the present invention include polysaccharides or carbohydrates such as colloids, starches, cereals or flours capable of absorbing and binding water. Examples of suitable materials include corn, tapioca, rice and potato starches, flours and the like. Polysaccharides such as algins, carrageenans, xanthan gum or various other colloids are also suitable as water binding materials. Carbohydrates which are particularly preferred are food starches which have good freeze thaw stability or possess the ability to retain water in the egg white portion after the product has been frozen and subsequently thawed. The water binding materials should be present in the egg white portion in an amount effective to prevent syneresis upon freezing and thawing, typically at levels between about 0.5 and 10% by weight of the egg whites. A preferred level is between about 2 and 4% by weight of the egg whites.

It is also possible, although not critical, to include proteolytic enzymes or other additives in the egg yolk portion as described in U.S. Pat. No. 3,510,315, although such an additive can be omitted entirely.

In the present invention, a dynamic preheating step is carried out at a product temperature below about 183° F. for the egg yolks and about 167° F. for the egg whites. As previously noted, shear conditions, as normally encountered in the dynamic heating of fluids, adversely affect coagulation of the yolks and whites. Accordingly, dynamic heating can only be carried out in conjunction with a static heating step to effectively coagulate the yolks and whites and must be carried out below certain temperatures in order for the static heating step to effectively coagulate the yolks or whites to a substantially firm texture.

Dynamic heating is intended to refer to a continuous process as is normally employed for the heating of fluids and it is not intended to limit the present invention by specific apparatus necessary to carry out the dynamic heating step of the present invention. Typically, various heat exchangers in which steam is the primary heating source are suitable, including heat exchangers indirectly heated by the steam or those which utilize direct steam injection to heat the slurry. Typical steam pressures are between 0–25 psig, more typically 10–20 psig. The most critical factor in the use of dynamic preheating for the yolks and whites is the adverse effect of shear on texture of the cooked yolks and whites. To minimize this problem it is essential to avoid dynamic preheating at a product temperature above about 183° F. for the yolks and about 167° F. for the whites. Typically, the product temperature range for dynamic preheating should be between about 149°–183° F. for the yolks and about 144°–167° F. for the whites. This degree of heat treatment provides sufficient heat to effectively complete coagulation of the yolks and whites to a substantially firm texture during the static heating step. Dynamic heating also increases the overall efficiency of the process by reducing the batch type heating process in which the yolks and whites are coagulated in individual containers to result in time and energy savings. While it is not completely understood why exceeding the above temperature limits during dynamic heating prevents coagulation of the yolks and whites during subsequent static heating, nevertheless, the heated yolks and whites will not set up or coagulate to a firm texture even with prolonged static heating.

The preheated yolks and whites are placed in separate containers and statically heated to complete coagulation of the yolks and whites. Although the exact type of apparatus or equipment used in the present process is not critical relative to practice of the present invention for the static heating step, a preferred container for heating is to place the yolks and whites in flexible containers or bags for immersion in the cooking baths. This permits easy transfer of the yolks and whites through the heating and freezing steps, followed by easy removal of the frozen yolks and whites from the containers prior to chopping. Heating of the yolks and whites is carried out in a hot water or steam bath at a temperature of between about 165°–210° F., preferably 170°–185° F., for a period of time sufficient to coagulate or effectively cook the egg yolks and whites to a substantially firm texture and typically about 10 to 20 minutes.

The heated or cooked yolks and whites are then removed from the cooking bath and cooled to facilitate rapid freezing either by spraying with cool water or dipping the containers into a cool water bath. The heated whites and yolks are then frozen as quickly as possible to a product temperature of 20°–30° F.

After freezing of the product to the above temperature the flexible containers with the frozen yolks and whites are briefly warmed to permit easy removal of the frozen yolks and whites from the containers as an integral mass for chopping. This brief period of warming to permit removal from the container does not appreciably alter the temperature of the frozen yolks and whites from the desired range of about 20°–30° F.

The separately cooked and frozen yolks and whites at a temperature range of 20°–30° F., preferably 22°–26° F., are then chopped by simultaneous or sequential feeding of the frozen yolks and whites to a mechanical chopping or cutting device to quickly subdivide the yolks and whites into small particles. It is not critical to the practice of the present process at what weight ratio the yolks and whites are combined during chopping and any weight ratio of whites and yolks may be used. A preferred weight ratio for the chopped egg product is 30 to 40 parts of yolk to 70 to 60 parts of white. An especially preferred ratio is about 30 parts of yolk to 70 parts of white since this weight ratio somewhat approximates the ratio of white to yolk normally found in whole eggs. Chopping may be carried out in any type of food cutter or similar device provided the temperature of the product during chopping does not rise above the noted temperature range by excessive heat generation during chopping.

The chopped, cooked egg product is then rapidly refrozen as a mixture even though only partial thawing on the surfaces of the yolks and whites has taken place during chopping. The chopped product is best frozen while in particulate form before being placed in a container. A preferred, though non-limiting means for quick freezing the chopped yolk and white mixture is by using an individual quick frozen system (IQF) of any type for quick freezing of the particulate yolks and whites.

The resultant product, because of separate cooking of the yolks and whites, has no discoloration from contact between the two and has a uniform, bright yellow color with separate and identifiable pieces of egg white. The particles of chopped white and yolks are relatively uniform without significant pasting or smearing of the yolk over the surfaces of the egg white particles. The diced product is highly suitable as a condiment for foodstuffs such as salads and represents a significant improvement over similar condiments prepared from cooked shell eggs.

The following Examples will serve as illustrative but non-limiting embodiments of the present invention.

EXAMPLE I

To 30 pounds of pasteurized liquid egg whites is added 7.4% by weight of modified food starch, with the tradename "Consista" manufactured by A. E. Staley, Decatur, Illinois and mixed.

The egg white, starch mixture and 30 pounds of pasteurized egg yolks are separately preheated by passing through a heat exchanger which comprises a 15 ft., 0.209" I.D. coil which is indirectly heated by steam at a pressure of 10–20 psig in the surrounding chamber for the heat exchanger coil. The flow rate of yolks and whites through the coil is 2 lb/min. The yolks are preheated to a product temperature of 180° F. and the whites preheated to a product temperature of 160° F. Following preheating, 2 lb. quantities of the yolks are metered into flexible, plastic bags. The bags are sealed and placed in a hot water bath held at a temperature of 194° F. for 10–20 minutes. It was observed that the whites and yolks cooked in this manner coagulated satisfactorily and had the characteristically firm texture of cooked egg yolks and whites. The bags containing the coagulated yolks and whites are conveyed through a water spray of cool water at 70°–75° F. and cooled.

The coagulated yolks and whites are then placed in a blast freezer and frozen to a product temperature of 20°–30° F.

The yolks and whites are removed from the flexible bags by brief thawing of the mass of frozen yolks and whites and 70 parts by weight of the whites and 30 parts by weight of the frozen yolks are placed in a batch type cutting device consisting of a rotating bowl and a set of vertically rotating, high speed cutting blades. The yolks and whites are chopped for a period of 3 minutes.

The chopped egg product is then refrozen before packaging by being passed through individually quick frozen system (IQF) to quick freeze the particles.

The egg product after chopping and freezing has no significant smearing of the yolks on the particles of egg whites and consisted of relatively uniform and distinct pieces of yolks and whites. The chopped product is highly suitable as a condiment for foodstuffs.

EXAMPLE II

To 30 pounds of pasteurized liquid egg whites is added 7.4% by weight of modified food starch, with the tradename "Consista", manufactured by A. E. Staley, Decatur, Illinois and mixed.

The egg white starch mixture and 30 pounds of pasteurized egg yolks are separately preheated by passing through a heat exchanger which comprises a 15 ft. 0.209" I.D. coil which is indirectly heated by steam at a pressure of 10–20 psig in the surrounding chamber for the heat exchanger coil. The flow rate of the yolks and whites through the coil is 2 pounds/minute. The yolks as preheated to a product temperature of 194° F. and the whites preheated to a product temperature of 176° F. Following preheating 2 lb. quantities of the egg white starch mixture and 2 lb. quantities of the yolks are metered into flexible plastic bags. The bags are sealed and placed in a hot water bath held at a temperature of 194° F. for 10–20 minutes. The yolks and whites would not set up to form firm coagulated yolks and whites and were judged to be unsuitable for further freezing and processing to form a frozen diced egg product.

Having described the above invention with reference to the above specific embodiments, it is to be understood that numerous variations can be made without departing from the spirit of the invention and it is intended to include such reasonable variations and equivalents within the scope of the present invention.

What is claimed is:

1. A method of forming a chopped egg product comprising:
   a. dynamically preheating egg yolks to a product temperature which does not exceed about 183° F. and dynamically preheating egg whites to a product temperature which does not exceed about 167° F. followed by statically heating egg yolks and egg whites at a temperature and time effective to coagulate the yolks and whites.
   b. freezing said coagulated yolks and whites,
   c. chopping the frozen whites and yolks at a temperature of between about 20°–30° F. to provide a chopped egg mixture without smearing of the yolks.

2. A method as set forth in claim 1 wherein the yolks and whites are statically heated at a temperature of between about 170° to 185° F.

3. A method as set forth in claim 1 wherein said egg whites includes a water binding agent in an amount effective to prevent syneresis during freezing and thawing of said product.

4. A method as set forth in claim 3 wherein the amount of water binding agent is between about 0.5 and 10% by weight of the egg whites.

5. A method as set forth in claim 4 wherein the amount of water binding agent is between about 2 and 4% by weight of the egg whites.

6. A method as set forth in claim 1 wherein the frozen yolks and whites are chopped at a temperature of between about 22°–26° F.

7. A method as set forth in claim 1 wherein the yolks are dynamically preheated to a temperature of between about 149°–183° F.

8. A method as set forth in claim 1 wherein the whites are dynamically preheated to a temperature of between about 144°–167° F.

9. A method as set forth in claim 1 wherein the frozen whites and yolks are combined in a weight ratio of 30:40 parts yolk to 70:60 parts whites during chopping.

10. A method as set forth in claim 9 wherein the frozen whites and yolks are combined in a weight ratio of 30 parts of yolks and 70 parts of whites.

11. A method as set forth in claim 1 including the step of refreezing the egg mixture after chopping.

12. A method of forming a cooked and frozen, chopped egg product comprising:
    a. dynamically preheating egg yolks to a product temperature which does not exceed about 183° F. and dynamically preheating egg whites to a product temperature which does not exceed about 167° F. followed by statically heating egg yolks and whites at a temperature of between about 170°–185° F. for a period of time effective to coagulate the yolks and whites.
    b. freezing said coagulated yolks and whites,
    c. chopping the frozen whites and yolks at a temperature of between about 20°–30° F. to provide a chopped egg mixture having a weight ratio of 30:40 parts of yolks to 70:60 parts of whites.

13. A method as set forth in claim 12 wherein said egg whites includes a water binding agent in an amount effective to prevent syneresis during freezing and thawing of said product.

14. A method as set forth in claim 13 wherein the amount of water binding agent is between about 0.5 and 10% by weight of the egg whites.

15. A method as set forth in claim 14 wherein the amount of water binding agent is between about 2 and 4% by weight of the whites.

16. A method as set forth in claim 12 wherein the frozen yolks and whites are chopped at a temperature of between about 22°–26° F.

17. A method as set forth in claim 12 wherein the frozen whites and yolks are combined in a weight ratio of about 30 parts of yolks and about 70 parts of whites.

18. A method of forming a cooked and frozen chopped egg product comprising:
    a. dynamically preheating egg yolks to a product temperature which does not exceed about 183° F. and dynamically preheating egg whites to a product temperature which does not exceed about 167° F. followed by statically heating egg yolks and whites at a temperature of between about 170° to 185° F. for a period of time effective to coagulate the yolks and whites;
    b. freezing said coagulated yolks and whites,
    c. chopping the frozen whites and yolks at a temperature of between about 22°–26° F. to provide a chopped egg mixture having a weight ratio of 30:40 parts of yolks to 70:60 parts of whites; and
    d. refreezing said chopped egg mixture.

* * * * *